(12) United States Patent
Van De Sluis et al.

(10) Patent No.: US 11,475,664 B2
(45) Date of Patent: Oct. 18, 2022

(54) DETERMINING A CONTROL MECHANISM BASED ON A SURROUNDING OF A REMOVE CONTROLLABLE DEVICE

(71) Applicant: SIGNIFY HOLDING B.V., Eindhoven (NL)

(72) Inventors: Bartel Marinus Van De Sluis, Eindhoven (NL); Dzmitry Viktorovich Aliakseyeu, Eindhoven (NL); Mustafa Tolga Eren, Eindhoven (NL); Dirk Valentinus Rene Engelen, Heusden-Zolder (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/297,793

(22) PCT Filed: Nov. 18, 2019

(86) PCT No.: PCT/EP2019/081591
§ 371 (c)(1),
(2) Date: May 27, 2021

(87) PCT Pub. No.: WO2020/114756
PCT Pub. Date: Jun. 11, 2020

(65) Prior Publication Data
US 2021/0397840 A1    Dec. 23, 2021

(30) Foreign Application Priority Data
Dec. 3, 2018 (EP) ...................................... 18209795

(51) Int. Cl.
*G06V 20/20* (2022.01)
*G06F 3/01* (2006.01)
*G06F 3/04842* (2022.01)

(52) U.S. Cl.
CPC .............. *G06V 20/20* (2022.01); *G06F 3/013* (2013.01); *G06F 3/04842* (2013.01)

(58) Field of Classification Search
CPC ..... G06V 20/20; G06F 3/04842; G06F 3/013; G06F 2203/0383; G06F 3/017;
(Continued)

(56) References Cited

U.S. PATENT DOCUMENTS

2014/0267770 A1 * 9/2014 Gervautz ................ H04L 67/32
348/169
2014/0379757 A1    12/2014 Samuels
(Continued)

*Primary Examiner* — Oschta I Montoya (57) ABSTRACT

The invention relates to a system (1) for identifying a device using a camera and for remotely controlling the identified device. The system is configured to obtain an image (21) captured with a camera. The image captures at least a surrounding of a remote controllable device (51). The system is further configured to analyze the image to recognize one or more objects (57) and/or features in the surrounding of the remote controllable device and select an identifier associated with at least one of the one or more objects and/or features from a plurality of identifiers stored in a memory. The memory comprises associations between the plurality of identifiers and remote controllable devices and the selected identifier is associated with the remote controllable device. The system is further configured to determine a control mechanism for controlling the remote controllable device and control the remote controllable device using the determined control mechanism.

13 Claims, 7 Drawing Sheets

(58) Field of Classification Search
CPC ...... G06F 3/0304; G06F 3/011; H04L 12/282; H04M 1/72415; H04M 2250/52; H04N 21/42204; H04N 21/42222; H04N 7/18; H04N 21/4131; H05B 47/125; H05B 47/19; G08C 2201/92; Y02B 20/40
See application file for complete search history.

(56) References Cited

U.S. PATENT DOCUMENTS

| | | |
|---|---|---|
| 2015/0028746 A1 | 1/2015 | Temple et al. |
| 2015/0319826 A1 | 11/2015 | Ahn et al. |
| 2016/0320934 A1 | 11/2016 | Thomason |
| 2017/0308272 A1 | 10/2017 | Levien et al. |
| 2018/0054487 A1 | 2/2018 | Hebsur et al. |
| 2019/0114061 A1* | 4/2019 | Daniels .................. G06F 3/048 |
| 2019/0391716 A1* | 12/2019 | Badr ................. G06K 9/00671 |

* cited by examiner

DETERMINING A CONTROL MECHANISM BASED ON A SURROUNDING OF A REMOVE CONTROLLABLE DEVICE

CROSS-REFERENCE TO PRIOR APPLICATIONS

This application is the U.S. National Phase application under 35 U.S.C. § 371 of International Application No. PCT/EP2019/081591, filed on Nov. 18, 2019, which claims the benefit of European Patent Application No. 18209795.6, filed on Dec. 3, 2018. These applications are hereby incorporated by reference herein.

FIELD OF THE INVENTION

The invention relates to a system for identifying a device using a camera and for remotely controlling said identified device.

The invention further relates to a method of identifying a device using a camera and remotely controlling said identified device.

The invention also relates to a computer program product enabling a computer system to perform such a method.

BACKGROUND OF THE INVENTION

Over the last years, a lot of Augmented Reality (AR) applications have been developed wherein upon identifying certain objects, information related to these objects is retrieved and presented. In the future, smart cameras and augmented reality devices may have object recognition algorithms running continuously, e.g. as part of the AR operating system. Augmented Reality enables a wide variety of applications & services. However, AR apps require the user to find and start the right AR app or service for every context.

US2014/0267770A1 discloses a method for managing applications associated with a mobile device according to the disclosure by: obtaining an image of an object in view of a cam-era associated with the mobile device; initiating an object identification procedure to identify the object in the image based on attributes of the object extracted from the image; identifying an application associated with the object based on the object identification procedure; and automatically launching the application on the mobile device.

US2017/0308272A1 discloses an augmented reality method that involves detecting objects in a scene, identifying one or more installed or available applications based on the detected objects, and placing icons representing the identified applications proximate to the detected objects in a display of the scene, e.g. so that a user can start or install the identified applications. For example, when the method recognizes a television, it may indicate an application that provides current television listings.

A drawback of the method disclosed in US2017/0308272A1 is that it is not always possible to determine a control mechanism for controlling a remote controllable device based on object recognition of this remote controllable device. For example, if a user has two similar looking lighting devices of different brands in his home, object recognition of one of these lighting devices might result in two matching lighting devices and thus two candidate applications.

SUMMARY OF THE INVENTION

It is a first object of the invention to provide a system, which is able to determine a control mechanism for controlling a remote controllable device when object recognition of the remote controllable device does not allow the remote controllable device's control mechanism to be identified or does not allow the remote controllable device's control mechanism to be identified uniquely.

It is a second object of the invention to provide a method, which is able to determine a control mechanism for controlling a remote controllable device when object recognition of the remote controllable device does not allow the remote controllable device's control mechanism to be identified or does not allow the remote controllable device's control mechanism to be identified uniquely.

In a first aspect of the invention, a system for identifying a device using a camera and for remotely controlling said identified device comprises at least one input interface, at least one output interface, and at least one processor configured to obtain an image via said at least one input interface, said image captured with a camera, said image capturing at least a surrounding of a remote controllable device and said remote controllable device, analyze said image to recognize one or more objects and/or features in said surrounding of said remote controllable device, identify said remote controllable device by selecting an identifier associated with at least one of said one or more objects and/or features from a plurality of identifiers stored in a memory, said memory comprising associations between said plurality of identifiers and remote controllable devices and said selected identifier being associated with said remote controllable device, determine a control mechanism for controlling said identified remote controllable device, and use said at least one output interface to control said identified remote controllable device using said determined control mechanism.

In this way, a control mechanism may be determined for a remote controllable device when object recognition of the remote controllable device does not allow the remote controllable device's control mechanism to be identified or does not allow the remote controllable device's control mechanism to be identified uniquely by determining the control mechanism based on objects and/or features recognized in the surrounding of the remote controllable device. Object recognition of a remote controllable device may not be sufficient for uniquely identifying the remote controllable device if a similar looking remote controllable device is present in the same spatial area or if the remote controllable device is fully or partly hidden. Examples of fully hidden remote controllable devices are cove lighting and set top boxes in closed, opaque AV cabinets.

Objects in the surrounding of the remote controllable device may comprise furniture, a painting, a wall, a window, a ceiling, other devices, and/or floor covering, for example. Said remote controllable device may comprise a controllable light source, for example. Said system may be a lighting system that comprises said remote controllable device or said system may be part of such a lighting system. A feature may comprise a specific color, color pattern, 3D structure (e.g. of a cove or cabinet) or object part (e.g. corner of table), for example. Object recognition builds on detecting a spatial combination of features. Said surrounding of said remote controllable device is normally a part of the space surrounding the device and not the complete space surrounding the device.

With the invention, a smart activation method for applications and services running on a smart camera device, such as a wearable or handheld Augmented Reality (AR) device, may be realized. It is expected that such devices will become widespread in the coming years, either as future versions of handheld smartphones or alternatively in the form of wearable smart glasses. Such devices will feature advanced cameras and 3D scanning sensors enabling them to model the 3D environment. These devices will enable a broad range of applications and services, which makes a smart activation method for applications and services particularly beneficial for these devices.

Especially in the case of smart glasses, such compact devices will also be resource constrained (e.g. processing and memory) which means that smart activation of relevant functionality is especially beneficial. Moreover, those devices may have limited means for user interaction which calls for intelligent ways to activate relevant functions for a detected context. Especially in the case of dedicated Augmented Reality devices, it is expected that these devices will continuously have object recognition algorithms active as part of the operating system, e.g. as part or extension of 3D scanning algorithms.

The invention also allows a control mechanism to be determined for a device that is moved around and whose control mechanism depends on its current location. For example, with a portable light device, a user might want to have different control mechanism depending of the location of the light device. In this case, the same device is associated with different sets of one or more surrounding objects and/or features corresponding to the different locations it may be in.

Said at least one processor may be configured to recognize said remote controllable device in said image and select said identifier by selecting an identifier associated with both said recognized at least one object and/or feature in said surrounding of said remote controllable device and said recognized remote controllable device. The remote controllable device itself may also be recognized in the image if the remote controllable device is not partly or fully hidden and this can be used to help identify the correct remote controllable device, e.g. if similar looking remote controllable devices are present in the same building.

Said at least one processor may be configured to recognize a plurality of remote controllable devices in said image and select said identifier by selecting an identifier associated with both recognized said at least one object and/or feature in said surrounding and one of said plurality of remote controllable devices. If the image captures a plurality of remote controllable devices, a plurality of remote controllable devices may be identified. From these identified remote controllable devices, one is selected, and this remote controllable device's control mechanism is then determined and used.

As a first example, said at least one processor may be configured to select a further identifier associated with both at least one of said one or more objects and/or features and a further one of said plurality of remote controllable devices, said further identifier being associated with a further remote controllable device and determine that said remote controllable device is nearer to the center or other reference point of said image than said further remote controllable device, wherein said identifier of said remote controllable device is selected upon determining that said remote controllable device is nearer to the center or other reference point of said image than said further remote controllable device. This is a simple way of selecting one remote controllable device from a plurality of identified remote controllable devices that does not require gaze detection. It is also possible that the AR device renders a system or user-defined image position or area, which it may render as a graphical overlay, and that the remote controllable device is selected which is nearest to this image position, or nearest to the center of the defined image area.

As a second example, said at least one processor may be configured to select a further identifier associated with both at least one of said one or more objects and/or features and a further one of said plurality of remote controllable devices, said further identifier being associated with a further remote controllable device, and determine that a user is looking at said remote controllable device in a rendering of said image, wherein said identifier of said remote controllable device is selected upon determining that said user is looking at said remote controllable device in said rendering of said image. This manner of selecting one remote controllable device from a plurality of identified remote controllable devices is a bit more complex, as it requires more hardware and/or software, but it may provide better results in certain situations.

Said at least one processor may be configured to select a further identifier associated with at least one object and/or feature of said one or more objects and/or features from said plurality of identifiers stored in said memory, said further identifier being associated with a further remote controllable device and use said at least one input interface to allow a user to use said determined control mechanism to select said remote controllable device from at least said remote controllable device and said further remote controllable device, and wherein said control mechanism is further associated with said further identifier and said control mechanism is further suitable for controlling said further remote controllable device.

Instead of automatically selecting one remote controllable device from a plurality of identified remote controllable devices, a control mechanism may be determined that is suitable for controlling multiple, preferably all, identified remote controllable devices. For example, a Philips Hue application may be determined as control mechanism if a plurality of Philips Hue lights is identified and a Google Home application may be determined as control mechanism if a Philips Hue light and a Google Chromecast are identified. The user is then able to select the correct remote controllable device from within the determined application. The same principle may be used if the image captures only a single remote controllable device, but there are multiple matching remote controllable devices due to these matching remote controllable devices all being associated with one or more surrounding objects and/or features recognized in the image.

Said at least one processor may be configured to associate at least one further object and/or feature of said one or more objects and/or features with said identifier of said remote controllable device in said memory in dependence on said user selecting said remote controllable device. By storing which remote controllable device the user selected from within the determined application, the system may learn which remote controllable device a user wishes to control if it captures a similar image in the future. This may make it unnecessary to train a system or may improve a trained system.

Said at least one processor may be configured to determine a light effect in said surrounding of said remote controllable device in said image and said selected identifier is further associated with one or more characteristics of said determined light effect. Recognition of a light effect, e.g. based on a light intensity, light color or illumination pattern, may be used to help identify the remote controllable device. For instance, the AR device might connect to the remote controllable lighting devices to determine what light effects they are currently rendering in order to be able to recognize these light effects in the image. This may be beneficial if the remote controllable device is partly or fully hidden, e.g. if the remote controllable device is a lighting device installed in a cove.

Said memory may comprise one or more descriptions of said at least one object and/or feature associated with said identifier. For instance, said at least one processor may be configured to use said at least one input interface to receive one or more descriptions of objects within a certain distance of said remote controllable device, select one or more object models based on said one or more descriptions and associate said selected object models with said identifier of said remote controllable device in said memory.

A description of an object may be "television", "kitchen sink", "refrigerator", "dotted wallpaper", "black microwave" or "kitchen window", for example. A description of an object may comprise one or more words derived from the room in which the object is located and one or more words describing the specific object, for example. This manner of training the system is beneficial for objects that can easily be described and typically takes less time than training the system using calibration images.

Said at least one processor may be configured to obtain a plurality of training images captured with a camera, said plurality of training images capturing a surrounding of said remote controllable device at different angles, analyze said plurality of training images to recognize one or more training objects and/or features which are present in each of said calibration images, and associate at least one of said one or more training objects and/or features with said identifier of said remote controllable device in said memory. Calibration with training images may be beneficial if it is difficult to describe objects with words or the object models associated with the words are not sufficient or suitable.

In a second aspect of the invention, a method of identifying a device using a camera and remotely controlling said identified device comprises obtaining an image captured with a camera, said image capturing at least a surrounding of a remote controllable device and said remote controllable device, analyzing said image to recognize one or more objects and/or features in said surrounding of said remote controllable device, identifying said remote controllable device by selecting an identifier associated with at least one of said one or more objects and/or features from a plurality of identifiers stored in a memory, said memory comprising associations between said plurality of identifiers and remote controllable devices and said selected identifier being associated with said remote controllable device, determining a control mechanism for controlling said identified remote controllable device, and controlling said identified remote controllable device using said determined control mechanism. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for identifying a device using a camera and remotely controlling said identified device.

The executable operations comprise obtaining an image captured with a camera, said image capturing at least a surrounding of a remote controllable device, analyzing said image to recognize one or more objects and/or features in said surrounding of said remote controllable device, selecting an identifier associated with at least one of said one or more objects and/or features from a plurality of identifiers stored in a memory, said memory comprising associations between said plurality of identifiers and remote controllable devices and said selected identifier being associated with said remote controllable device, determining a control mechanism for controlling said remote controllable device, and controlling said remote controllable device using said determined control mechanism.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
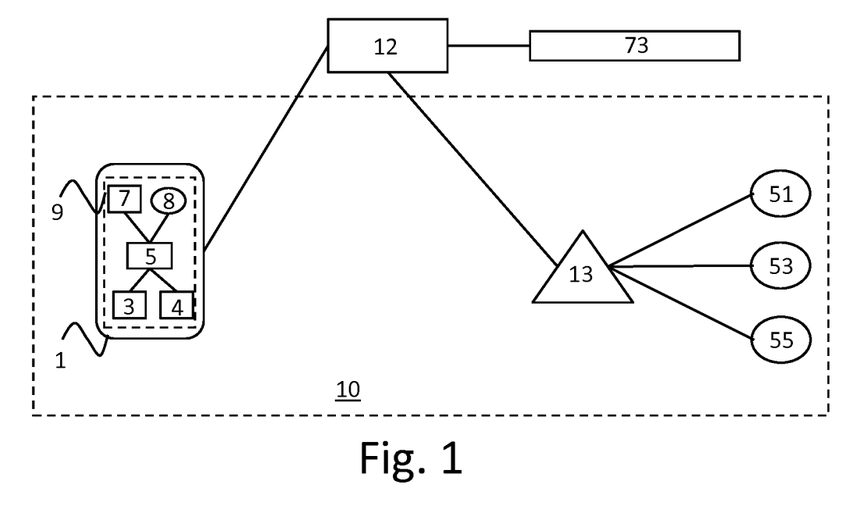
FIG. 1 is a block diagram of an embodiment of the system.

FIG. 1 shows an embodiment of the system for identifying a device using a camera and for remotely controlling the identified device. In the embodiment of FIG. 1, the system is a mobile device 1. The mobile device 1 is connected to a wireless LAN access point 12. A bridge 13, e.g. a Philips Hue bridge, is also connected to the wireless LAN access point 12, e.g. via Ethernet. The bridge 13 communicates with the lighting devices 51, 53 and 55, e.g. using Zigbee technology. The lighting devices 51,53 and 55 may be Philips Hue lights, for example. A TV 73 is also connected to the wireless LAN access point 12. The mobile device 1, the bridge 13 and the lighting devices 51,53 and 55 are part of lighting system 10.

The mobile device 1 comprises a receiver 3, a transmitter 4, a processor 5, memory 7, a camera 8 and a touchscreen display 9. The processor 5 is configured to use an internal interface, e.g. bus, to obtain an image captured with the camera 8. The image captures at least a surrounding of a remote controllable device, e.g. one or more of the lighting devices 51, 53 and 55 and the TV 73. In an alternative embodiment, the processor 5 is configured to use the receiver 3 to receive an image captured with an external camera.

In the embodiment of FIG. 1, the processor 5 is further configured to analyze the image to recognize one or more objects and/or features in the surrounding of the remote controllable device and select an identifier associated with at least one of the one or more objects and/or features from a plurality of identifiers stored in the memory 7. The memory 7 comprises associations between the plurality of identifiers and remote controllable devices and the selected identifier being associated with the remote controllable device. In an alternative embodiment, the associations are stored in a memory of an Internet server.

In the embodiment of FIG. 1, the processor 5 is further configured to determine a control mechanism for controlling the remote controllable device and use the transmitter 4 to control the remote controllable device using the determined control mechanism. An identifier of the control mechanism, e.g. an application, may be associated with the identifier in the memory 7, for example.

The image may be a photograph captured when the user presses a button or may be part of video captured by the user, for example. In the latter case, identification of the remote controllable device that a user wants to control may be started as soon an object corresponding to a remote controllable device is in the center of the image or in another control area and/or receives attention for a predefined minimal time duration, e.g. if a user does not move the device for this time duration.

Not only may identification of the remote controllable device that a user wants to control be started as soon an object corresponding to a remote controllable device is in the control area, but this control area may also be used to determine which device from a plurality of remote controllable devices the user wants to control. The control area may be indicated on a photo or video stream and the user may be instructed to ensure that the device of interest is within this control area. The size of the control area may be predefined or dynamic, e.g. based on multitude of controllable devices detected.

However, the use of a control area is not required. For example, identification of the remote controllable device that a user wants to control may be started if the user is detected to be looking at the remote controllable device in the image for a predefined minimal time duration. The latter may be implemented using gaze detection, for example. Gaze detection may also be used to determine which device from a plurality of remote controllable devices the user is looking at. The gaze of the user may be detected with a camera directed to the user's eyes, e.g. with a selfie camera in the mobile device 1. This camera may also be used to receive explicit input from the user. For example, the user may be able to provide explicit input indicating that he wishes to access the control mechanism, e.g. by a double blink of the eyes. In this case, it is not necessary to wait until the user has looked at the remote controllable device in the image for a predefined minimal time duration.

Objects, including the objects surrounding the remote controllable device, may be recognized using known object recognition algorithms. Features of the objects are detected and compared with object models. Object models comprise visual identification properties. The objects models may be learned by training the system with calibration images. Alternatively, descriptions of objects may be provided, and object models may be obtained based on these descriptions. Alternatively, connected devices could broadcast their object models. Connected devices could also broadcast information identifying which control mechanism, e.g. application, can be used to control them.

Normally, by recognizing objects and/or features in the surrounding of the remote controllable device, it should be possible to identify the remote controllable device's control mechanism uniquely. However, additional properties may also be used to help to uniquely identify the remote controllable device. For example, an identifier of a remote controllable device may be further associated with a location and RF-based localization or GPS-based position detection may be used to determine whether the mobile device 1 is located near this remote controllable device and thus, that this remote controllable device might be the remote controllable device that the user wishes to control.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from Qualcomm or ARM-based, or an application-specific processor. The processor 5 of the mobile device 1 may run an Android or iOS operating system for example. The memory 7 may comprise one or more memory units. The memory 7 may comprise solid-state memory, for example. The memory 7 may be used to store an operating system, applications and application data, for example.

The receiver 3 and the transmitter 4 may use one or more wireless communication technologies such as Wi-Fi (IEEE 802.11) to communicate with the wireless LAN access point 12, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The camera 8 may comprise a CMOS or CCD sensor, for example. The display 9 may comprise an LCD or OLED panel, for example. The mobile device 1 may comprise other components typical for a mobile device such as a battery and a power connector. The invention may be implemented using a computer program running on one or more processors.

In the embodiment of FIG. 1, a bridge is used to control lighting devices 51-53. In an alternative embodiment, lighting devices 51-53 are controlled without using a bridge. In the embodiment of FIG. 1, the system is a mobile device. In an alternative embodiment, the system of the invention is a different device, e.g. a pair of Augmented Reality glasses, or comprises a plurality of devices.

Figure 2:
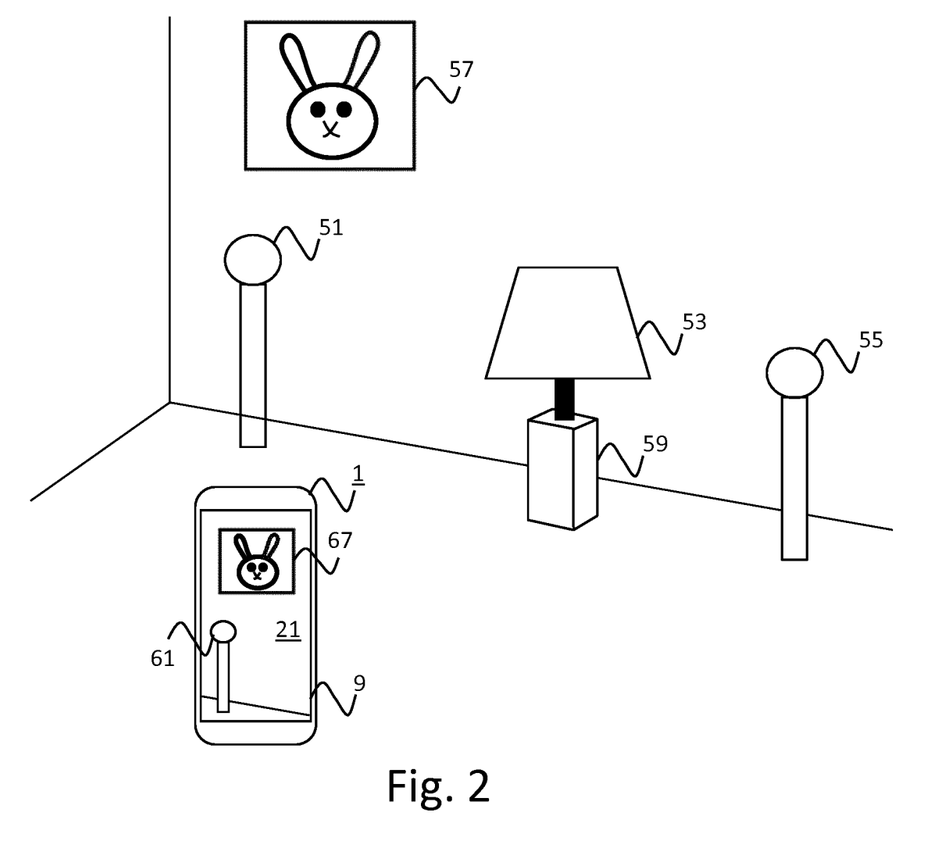
FIG. 2 depicts a first example of an image capturing a surrounding of a remote controllable device.

FIG. 2 depicts a first example of an image capturing a surrounding of a remote controllable device. In the example of FIG. 2, the mobile device 1 has captured an image 21 and displays the image 21 on display 9. The image 21 captures a part of a room and in particular comprises an object 67 corresponding to a painting 57 and an object 61 corresponding to remote controllable lighting device 51. The room further comprises the remote controllable lighting devices 53 and 55. The lighting device 53 is standing on a table 59.

In this example, an object model corresponding to the painting 57 as well as an object model corresponding to the lighting device 51 are associated with an identifier of the lighting device 51, e.g. in the memory 7 of the mobile device 1. Although the lighting device 55 looks the same as the lighting device 51, as the lighting device 55 has not been associated with an object model corresponding to the painting 57, the mobile device 1 is able to select the identifier of the lighting device 51 and determine which control mechanism can be used to control the lighting device 51.

Figure 3:
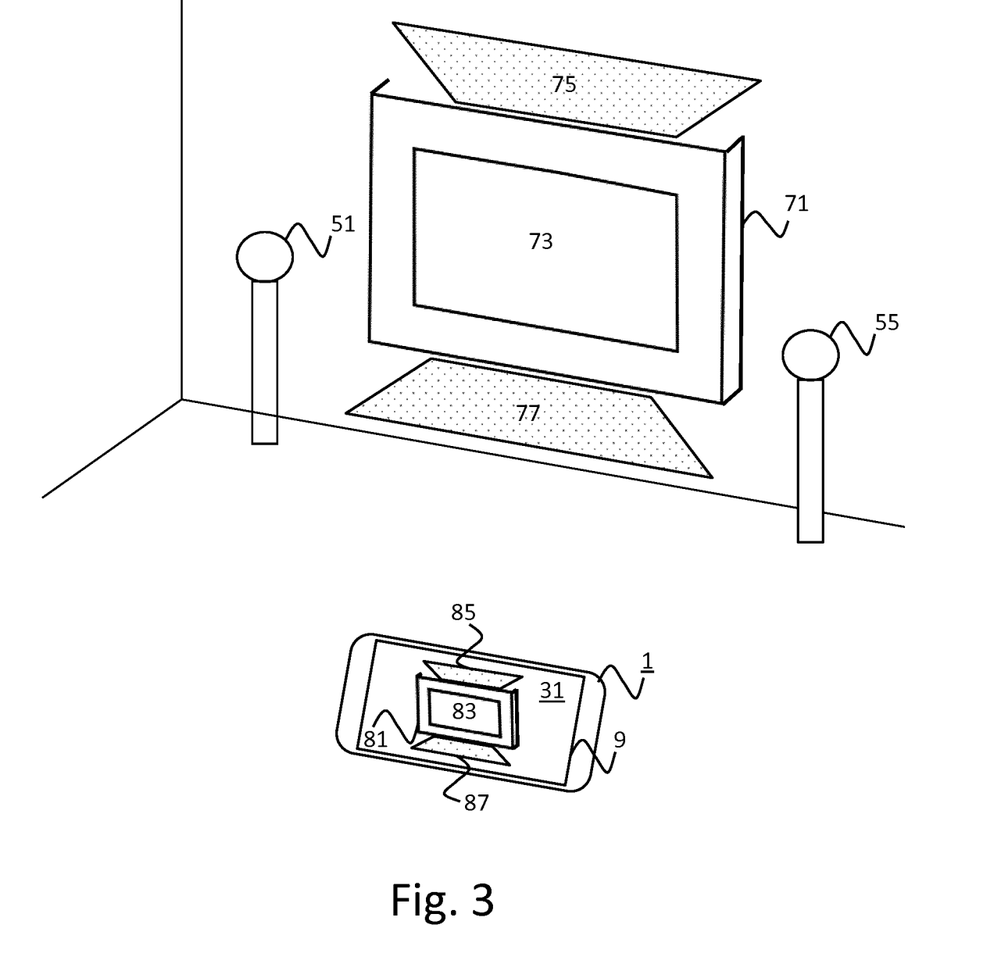
FIG. 3 depicts a second example of an image capturing a surrounding of a remote controllable device.

FIG. 3 depicts a second example of an image capturing a surrounding of a remote controllable device. In the example of FIG. 3, the mobile device 1 has captured an image 31 and displays the image 31 on display 9. The image 31 captures a part of a room and in particular comprises an object 83 corresponding to a TV 73, an object 81 corresponding to a TV cabinet 71, a region 85 corresponding to a light effect 75 and a region 87 corresponding to a light effect 77. The light effect 75 is rendered by a lighting device hidden at the top of the TV cabinet 71 inside the cabinet. The light effect 77 is rendered by a lighting device hidden at the bottom of the TV cabinet 71 inside the cabinet. The room further comprises the remote controllable lighting devices 51 and 55.

In this example, an object model corresponding to the TV cabinet 71 as well as characteristics of the light effects 75 and 77 are associated with an identifier of the TV 73, e.g. in the memory 7 of the mobile device 1. Although the TV 73 looks similar to another TV in the same home, as this other TV has not been associated with an object model corresponding to the TV cabinet 71 and characteristics of the light effects 75 and 77, the mobile device 1 is able to select the identifier of the TV 73 and determine which control mechanism can be used to control the TV 73.

If the lighting devices inside the TV cabinet 71 are also remote controllable, then it may be beneficial to determine the control mechanism for controlling these lighting devices as well. For example, an identifier of the lighting device at the top of the TV cabinet 71 may be associated with the object model corresponding to the TV cabinet 71 and with characteristics of the light effect 75. If an image would be captured that comprises both the area 85 and the object 81, but not the area 87 and the object 83, then the identifier of the lighting device at the top of the TV cabinet 71 or both this identifier and the identifier of the TV 73 could be selected. In the latter case, an application might be launched or recommended that is able to control both the TV 71 and the lighting device at the top of the TV cabinet 73.

Figure 4:
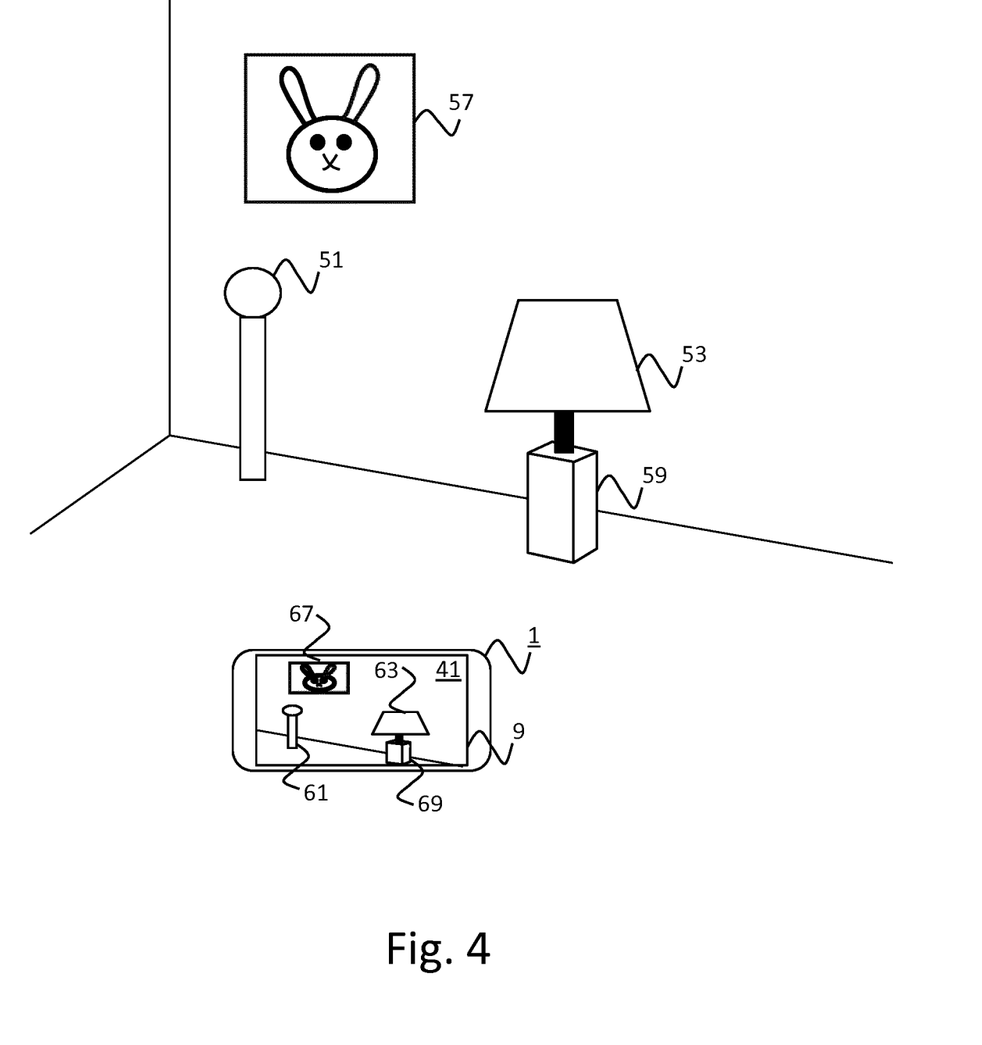
FIG. 4 depicts a third example of an image capturing a surrounding of a remote controllable device.

FIG. 4 depicts a third example of an image capturing a surrounding of a remote controllable device. In the example of FIG. 4, the mobile device 1 has captured an image 41 and displays the image 41 on display 9. The image 41 captures a part of a room and in particular comprises an object 67 corresponding to a painting 57, an object 61 corresponding to the remote controllable lighting device 51, an object 63 corresponding to the remote controllable lighting device 53, and an object 69 corresponding to the table 59.

In this example, an object model corresponding to the painting 57 as well as an object model corresponding to the lighting device 51 are associated with an identifier of the lighting device 51, e.g. in the memory 7 of the mobile device 1. Furthermore, an object model corresponding to the table 59 as well as an object model corresponding to the lighting device 53 are associated with an identifier of the lighting device 53, e.g. in the memory 7 of the mobile device 1.

Initially, both the identifier corresponding to the lighting device 51 and the identifier corresponding to the lighting device 53 are selected from the plurality of identifiers. Next, either an application is launched which is able to control both lighting device 51 and lighting device 53 and in which the user can select the desired lighting device or the identifier of one of the two lighting devices 51 and 53 is selected and an application is launched which is able to control this specific lighting device and in which the user does not need to select the desired lighting device.

In order to select one identifier from the two identifiers, the method may involve determining whether the user is looking at object 61 or at object 63 or the method may involve determining whether object 61 or object 63 is nearer to the center or other reference point of the image 41. In the example of FIG. 4, the object 63 is nearest to the center or other reference point of the image 41.

Figure 5:
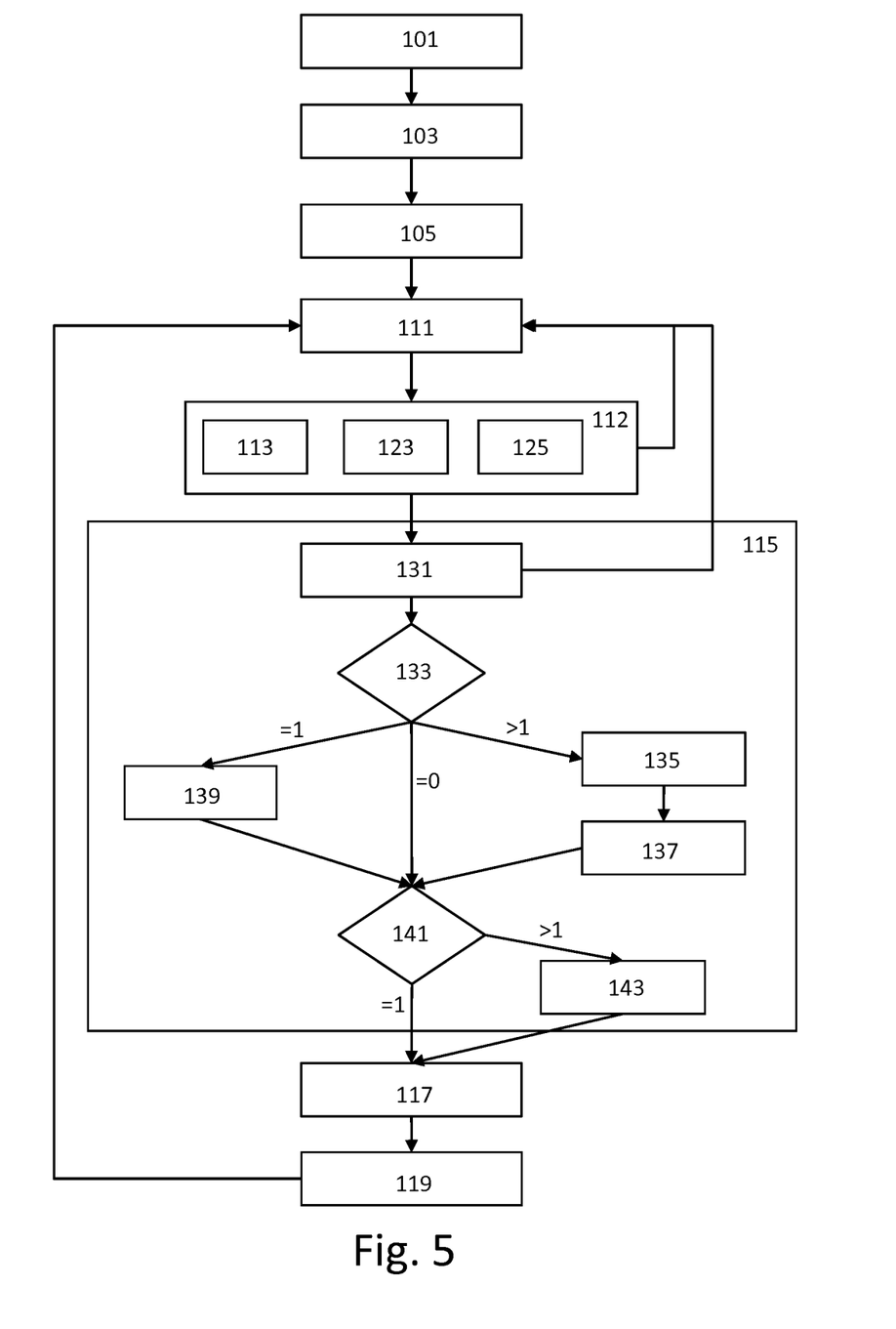
FIG. 5 is a flow diagram of a first embodiment of the method.

A first embodiment of the method of identifying a device using a camera and remotely controlling the identified device is shown in FIG. 5. In this first embodiment, a calibration is performed first in steps 101 to 105. Step 101 comprises obtaining a plurality of training images captured with a camera. The training images capture a surrounding of the remote controllable device at different angles. Step 103 comprises analyzing the plurality of training images to recognize one or more training objects and/or features which are present in each of the calibration images. Step 105 comprises associating at least one of the one or more training objects and/or features with the identifier of the remote controllable device in the memory.

After the calibration steps, steps 111,112,115,117 and 119 are performed. Step 111 comprises obtaining an image captured with a camera. The image captures at least a surrounding of a remote controllable device. Step 112 comprises analyzing the image. In the embodiment of FIG. 5, step 112 comprises sub steps 113, 123 and 125. Step 113 comprises analyzing the image to recognize one or more objects and/or features in the surrounding of the remote controllable device, e.g. by comparing features extracted from the image with stored object models associated with surrounding objects and/or features. Step 123 comprises analyzing the image to recognize one or more unidentified remote controllable devices, e.g. by comparing features extracted from the image with stored object models associated with remote controllable devices. The distances between objects and/or features may also be determined, e.g. using a stereo camera. If no objects and/or features are recognized in step 112, step 111 may be repeated.

Step 125 comprises analyzing the image to determine one or more light effects in the surrounding of the remote controllable device, e.g. by comparing a recognized illumination pattern with stored illumination patterns or by comparing other characteristics of a recognized light effect. If at least a certain quantity of adjacent pixels has an increased brightness/lightness compared to non-adjacent pixels and shows a decrease in brightness/lightness in directions away from a center region, the area formed by these adjacent pixels may be recognized as a light effect and the shape of this area and the shape of the center region may be used as characteristics of the illumination pattern, for example.

Step 115 comprises selecting an identifier associated with at least one of the one or more recognized objects and/or features from a plurality of identifiers stored in a memory. The memory comprises associations between the plurality of identifiers and remote controllable devices. The selected identifier is associated with the remote controllable device. In the embodiment of FIG. 5, step 115 comprises sub steps 131 to 143.

Step 131 comprises determining all identifiers associated with at least one of the objects and/or features recognized in the image. If no such identifier exists, step 111 may be repeated. Otherwise, step 133 is performed. If distances between objects and/or features are associated with the identifiers and recognized in step 112, then identifiers associated with distances between objects and/or features, e.g. between a sprinkler and a door, that do not match recognized distances between these objects and/or features may be removed before proceeding to step 133.

Step 133 comprises determining how many remote controllable devices have been recognized in the image. At this stage, it has been determined that the image captures one or more remote controllable devices, e.g. the features of an object in the image matches one or more remote controllable devices, but no remote controllable devices have been identified yet, e.g. because the object matches multiple remote controllable devices.

If multiple unidentified remote controllable devices have been recognized, i.e. that are multiple objects in the image that match one or more remote controllable devices, then step 135 is performed. Step 135 comprises determining which of the objects is nearest to the center or other reference point of the image. Step 137 comprises removing the identifiers not associated with the nearest object, i.e. not associated with the unidentified remote controllable device nearest to the center or other reference point of the image.

Step 141 is performed after step 137. Step 141 comprises determining whether there are multiple remaining identifiers. If not, then the one remaining identifier is selected and step 117 is performed. If multiple identifiers remain, step 143 is performed. Step 143 comprises selecting one of these multiple identifiers. If an identifier is associated with a surrounding object or feature that is not recognized in the image, then this does not mean that it is not the remote controllable device corresponding to this identifier that is captured in the image, as the image might only capture part of the surroundings of the remote controllable device, for example.

However, if an identifier is associated with multiple recognized objects and/or features (e.g. an object corresponding to the remote controllable device itself and a surrounding object or feature), then it is more likely that this identifier corresponds to the remote controllable device captured in the image than if the identifier is associated with a single recognized object (e.g. only an object corresponding to the remote controllable device itself). In the embodiment of FIG. 5, in step 143, the number of recognized objects and/or features and recognized light effects associated with an identifier is counted per identifier and identifiers that do not have the highest count are removed.

If it is determined in step 133 that a single unidentified remote controllable device has been recognized, then step 139 performed. Step 139 comprises removing the identifiers not associated with the recognized unidentified remote controllable device. In the embodiment of FIG. 5, it is assumed that if one or more remote controllable devices are recognized in the image, it is the user's desire to control one of these remote controllable devices and not a partly or fully hidden remote controllable device such as a cove lighting device. Step 141 is performed after step 139.

If it is determined in step 133 that no remote controllable device has been recognized, then step 141 is performed immediately. If a first identifier is associated with multiple recognized surrounding objects and/or features or a recognized surrounding object and/or feature and a recognized light effect and a second identifier is associated with a single recognized surrounding object and/or feature, then it is more likely that the first identifier corresponds to the remote controllable device that the user wishes to control, and the second identifier may be removed in step 143.

Step 117 comprises determining a control mechanism, e.g. an application or control commands, for controlling the remote controllable device. The application may be automatically downloaded and/or automatically started. Step 119 comprises controlling the remote controllable device using the determined control mechanism. The determined control mechanism may be used by a user of a device or may be used by the device itself without user involvement. For example, based on the selected identifier, an associated app may be activated. If the app is not available on the device yet it may be downloaded. This can either depend on user preferences or can be based on detecting that the user is seriously interested in or interacting with the detected object. After step 119, step 111 may be repeated.

Figure 6:
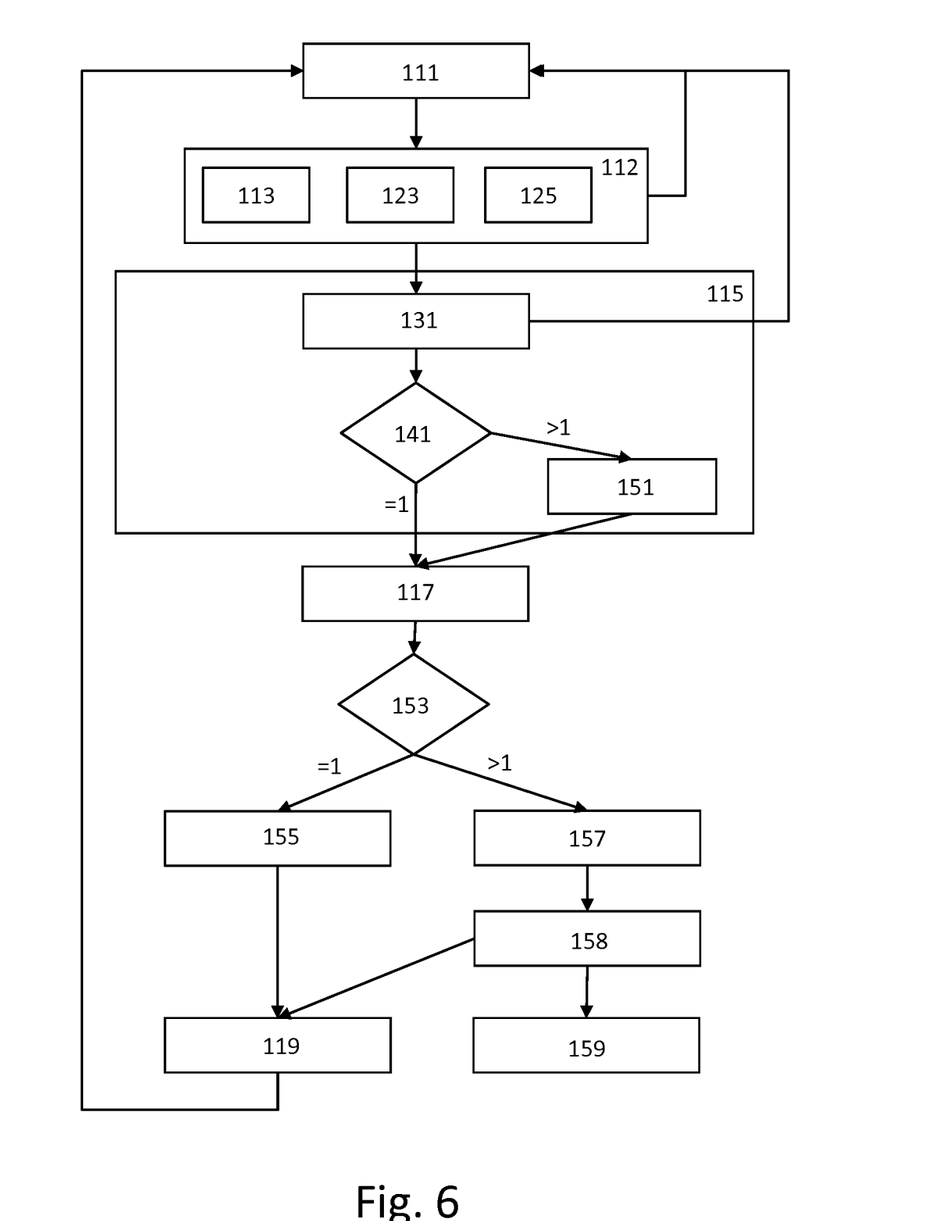
FIG. 6 is a flow diagram of a second embodiment of the method.

A second embodiment of the method is shown in FIG. 6. In this second embodiment, no calibration is performed, and the method starts with steps 111 and 112 of FIG. 5. In the embodiment of FIG. 6, step 115 comprises sub steps 131, 141 and 151. Step 131 has been described in relation to FIG. 5. Step 141 comprises determining whether there are multiple identifiers. If not, then the single identifier is selected and step 117 is performed. If there are multiple identifiers, step 151 is performed. Step 151 comprises determining which of the identifiers determined in step 131 are not associated with at least a further recognized object or feature and not associated with a determined light effect and removing these identifiers if at least one identifier would remain. In an alternative embodiment, stricter requirements may be applied to reduce the quantity of identifiers even further.

Step 117 is performed after steps 141 and 151. In the embodiment of FIG. 6, step 117 comprises determining which application is suitable for controlling all of the remote controllable devices corresponding to the remaining one or more identifiers. For example, a Philips Hue application may be determined as control mechanism if a plurality of Philips Hue lights is identified and a Google Home application may be determined as control mechanism if a Philips Hue light and a Google Chromecast are identified.

A step 153 is performed after step 117. Step 153 comprises determining whether there are multiple remaining identifiers. If not, then step 155 is performed. Step 155 comprises launching the application determined in step 117 and informing the application which remote controllable device the user wants to control such that he is immediately able to control his remote controllable device. Step 119 is performed after step 155.

If multiple identifiers remain, step 157 is performed. Step 157 comprises launching the application determined in step 117. A step 158 is performed after step 157. Step 158 allows the user to select the remote controllable device that he wants to control from within the application. The application may allow the user to select from among all devices that are known to the application or from a subset thereof. The subset includes the remote controllable devices corresponding to the remaining identifiers.

Steps 119 and 159 are performed after step 158. Step 159 comprises associating at least one further object and/or feature of the one or more surrounding objects and/or features with the identifier of the remote controllable device selected in step 158. Step 119 comprises controlling the remote controllable device using the determined control mechanism.

Figure 7:
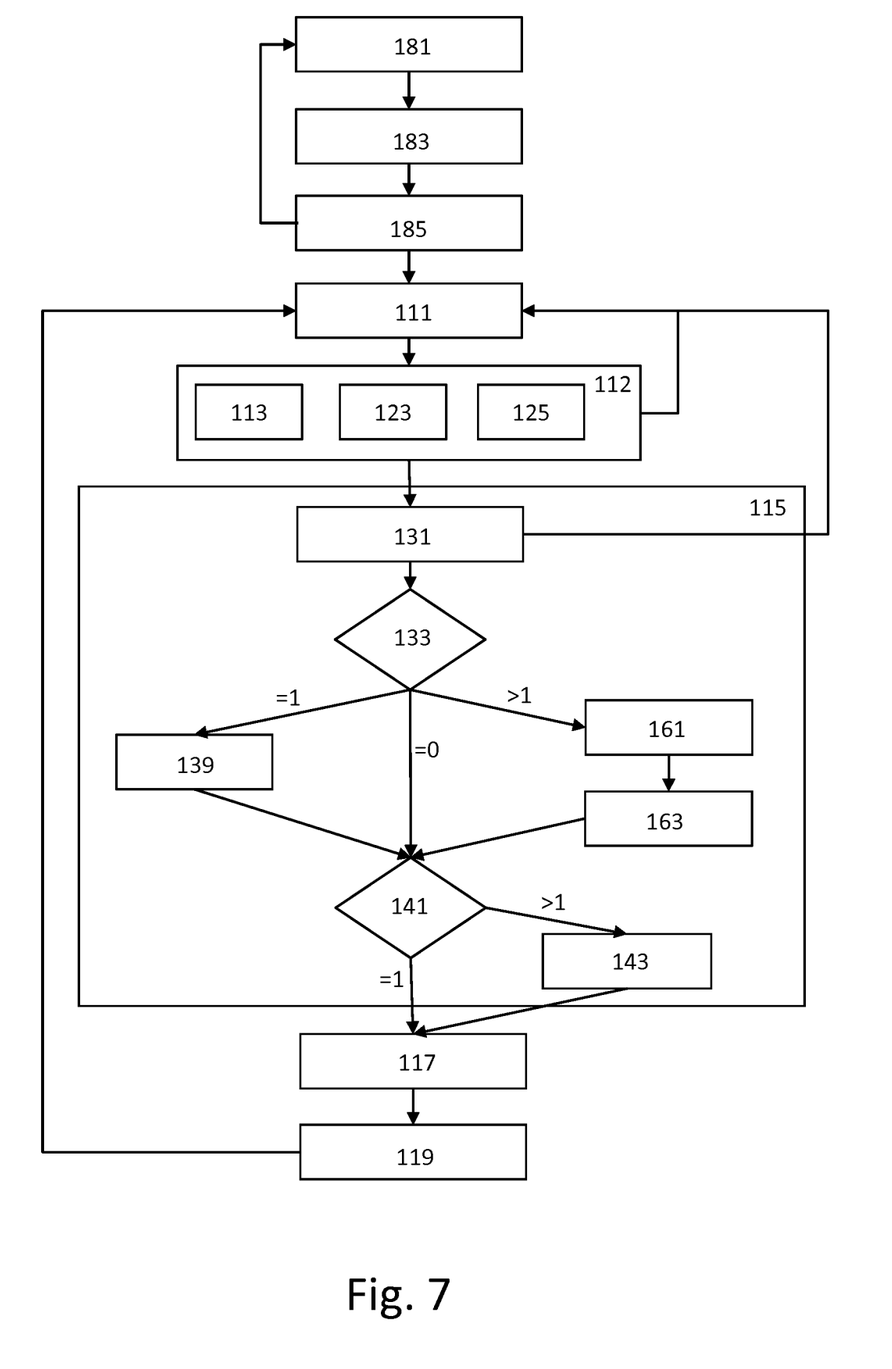
FIG. 7 is a flow diagram of a third embodiment of the method.

A third embodiment of the method is shown in FIG. 7. In this third embodiment, the system is setup without the user having to take calibration images, but instead, the user provides descriptions of objects surrounding remote controllable devices. The setup of the system is performed in steps 181,183 and 185. Step 181 comprises receiving one or more descriptions of objects within a certain distance of a remote controllable device. Step 183 comprises selecting one or more object models based on the one or more descriptions. Step 185 comprises associating the selected object models with the identifier of the remote controllable device in a memory. The descriptions may also be stored with the identifier of the remote controllable device in the memory. This allows the setup to be easily modified and object models to be replaced with other object models when the descriptions are modified. Steps 181,183, and 185 may be performed for multiple remote controllable devices.

After steps 181-185, steps 111 and 112 of FIG. 5 are performed. In sub step 123 of step 112, the object models stored in the memory in step 185 are used to recognize the surrounding objects. Step 115 is performed after step 112. Step 115 of FIG. 7 is similar to step 115 of FIG. 5, except that steps 135 and 137 of FIG. 5 have been replaced with steps 161 and 163. Step 161 comprises determining which object corresponding to a remote controllable device the user is looking at in a rendering of the image or which unidentified remote controllable device the user is looking at in real space (e.g. if augmented reality glasses are used). Step 137 comprises removing the identifier(s) not associated with the unidentified remote controllable device(s) the user is looking at. After step 115, steps 117 and 119 are performed as described in relation to FIG. 5.

In the embodiments of FIGS. 5 to 7, not only objects and/or features in the surrounding of the remote controllable device that the user wishes to control, but also the remote controllable device itself and one or more light effects are recognized and used to identify the remote controllable device. In variants on these embodiments, only the remote controllable device or only the one or more light effects or neither are recognized and used to identify the remote controllable device.

In the embodiment of FIG. 5, the system is setup by using calibration images and, if multiple remote controllable devices are captured in an image, the desired remote controllable device is selected based on which remote controllable device is represented closest to the center or other reference point of the image. In an alternative embodiment, only one of these two techniques is used.

In the embodiment of FIG. 7, the system is setup by using descriptions of the surrounding objects and, if multiple remote controllable devices are captured in an image, the desired remote controllable device is selected based on which remote controllable device a user looking at. In an alternative embodiment, only one of these two techniques is used. Multiple techniques from the embodiments of FIGS. 5 to 7 may be combined in a single embodiment.

As a first example of a use case, a lighting control app may be launched upon detecting a connected lighting device. In this use case, the identified object is a connected lighting device and upon detecting and identifying it, the corresponding lighting control app is activated. In the case that it is the first time that the lighting device is detected, the associated lighting control app may be downloaded. In this case, based on additional inputs, it may be determined if the user is really interested in configuring or controlling the connected lighting device in order to avoid download of apps which are unlikely to be relevant or used. This can be done by detecting that the user is really focused on the lighting device, e.g. looking at it or moving towards it while the area is also (getting) dark.

Besides downloading the app, the app may also be already available on the user device and launched or activated upon detecting the lighting device. The lighting device is uniquely identified by using features from the surrounding area to distinguish between lighting devices having an identical appearance. This step may be executed by the operating system before the app is activated, for example.

Activated apps may run in the background to enable fast access or may launch in the foreground to allow the user to control the lighting device immediately. The latter may be performed if it is clear that it is the user's intention to control the device, for example. If the app is not activated yet, a subtle indication may be displayed enabling the user to activate the associated app, e.g. by presenting an app icon in the image with a visual relation to the device that can be controlled.

As a second example of a use case, a music streaming app may be launched upon detecting a connected speaker. When pointing an augmented reality (AR) device (e.g. a mobile phone or augmented reality glasses) to the connected speaker, the streaming app is started on the AR device and/or the speaker. The speaker can already start playing a preferred playlist, while the user can still modify the music selection via the streaming app.

As a third example of a use case, the determined control mechanism uses voice control. When a user is watching a certain (detected) object corresponding to a remote controllable device and provides a voice command, the voice command is routed to the associated app. For example, in a setting with a speaker and a few lamps, the speaker is streaming some music while the lamps provide light effects supporting the music. The command "stop playing" when looking at the speaker, stops the music playback and/or streaming. When looking at one of the lamps, the rendering of the supporting light effects is stopped, while the music streaming continues.

Figure 8:
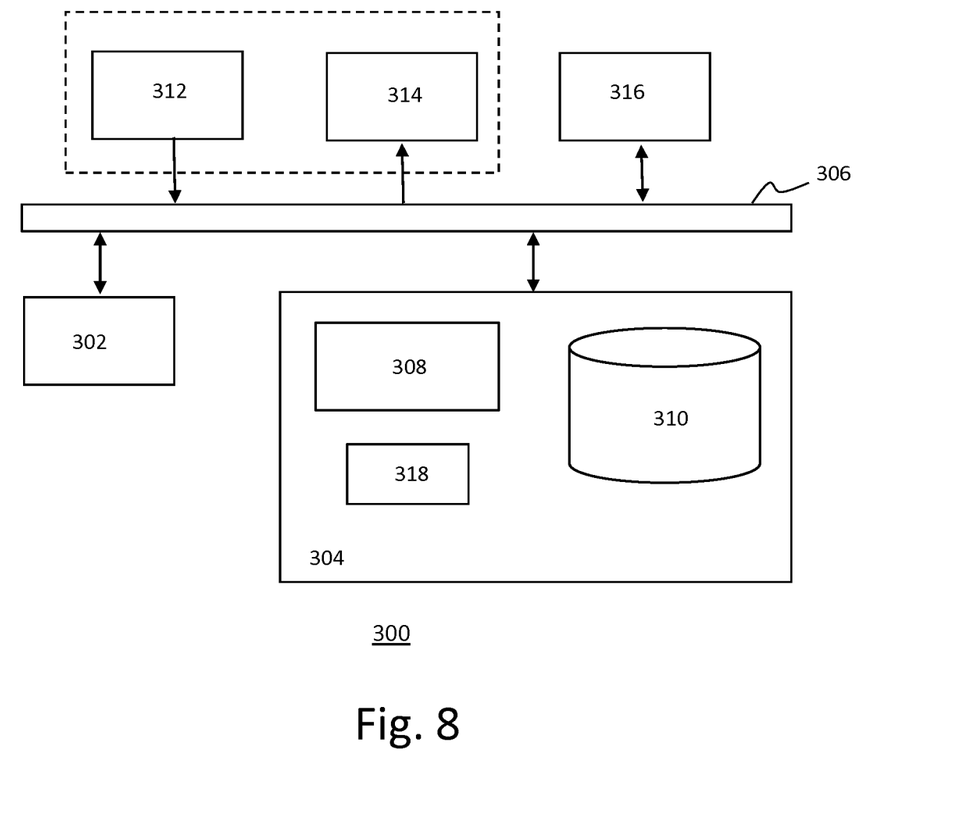
FIG. 8 is a block diagram of an exemplary data processing system for performing the method of the invention.

FIG. 8 depicts a block diagram illustrating an exemplary data processing system that may perform the method as described with reference to FIGS. 5 to 7.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for identifying a given remote controllable device using a camera and for remotely controlling said identified given remote controllable device, said system comprising:
   at least one input interface;
   at least one output interface; and
   at least one processor configured to:
   obtain an image via said at least one input interface, said image captured with a camera, said image capturing at least a surrounding of said given remote controllable device and said given remote controllable device,
   recognize one or more objects and/or features in said surrounding of said given remote controllable device by analyzing said image, wherein said one or more objects and/or features is distinct from said given remote controllable device and wherein said one or more objects and/or features is primarily configured for a function that is distinct from controlling said given remote controllable device,
   identify said given remote controllable device by selecting a given identifier associated with at least one of said one or more objects and/or features from a plurality of identifiers stored in a memory, said memory comprising associations between said plurality of identifiers and remote controllable devices, and said selected given identifier being associated with said given remote controllable device,
   determine a control mechanism for controlling said identified given remote controllable device, and
   use said at least one output interface to control said identified given remote controllable device using said determined control mechanism;
   wherein said at least one processor is configured to recognize said given remote controllable device in said image and select said given identifier based on the recognizing in the image of both the given remote controllable device and the at least one of said one or more objects and/or features.

2. A system as claimed in claim 1, wherein said at least one processor is configured to recognize a plurality of remote controllable devices in said image, and wherein said given identifier is associated with both said recognized at least one of said one or more objects and/or features in said surrounding and an unidentified one of said plurality of remote controllable devices.

3. A system as claimed in claim 2, wherein said at least one processor is configured to:
   select a further identifier associated with both at least one of said one or more objects and/or features and a further remote controllable device of said plurality of remote controllable devices, and
   determine that said given remote controllable device is nearer to the center or other reference point of said image than said further remote controllable device,
   wherein said identifier of said given remote controllable device is selected in response to determining that said given remote controllable device is nearer to the center or other reference point of said image than said further remote controllable device.

4. A system as claimed in claim 2, wherein said at least one processor is configured to:
select a further identifier associated with both at least one of said one or more objects and/or features and a further remote controllable device of said plurality of remote controllable devices, and
determine that a user is looking at said given remote controllable device in a rendering of said image,
wherein said given identifier of said given remote controllable device is selected in response to determining that said user is looking at said given remote controllable device in said rendering of said image.

5. A system as claimed in claim 1, wherein said at least one processor is configured to:
select a further identifier associated with at least one object and/or feature of said one or more objects and/or features from said plurality of identifiers stored in said memory, said further identifier being associated with a further remote controllable device, and
use said at least one input interface to allow a user to use said determined control mechanism to select said given remote controllable device from at least said given remote controllable device and said further remote controllable device, and
wherein said control mechanism is further associated with said further identifier and said control mechanism is further suitable for controlling said further remote controllable device.

6. A system as claimed in claim 5, wherein said at least one processor is configured to associate at least one further object and/or feature of said one or more objects and/or features with said given identifier of said given remote controllable device in said memory in dependence on said user selecting said given remote controllable device.

7. A system as claimed in claim 1, wherein said at least one processor is configured to determine a light effect in said surrounding of said given remote controllable device in said image and said selected given identifier is further associated with one or more characteristics of said determined light effect.

8. A system as claimed in claim 1, wherein said memory comprises one or more descriptions of said at least one of said one or more objects and/or features associated with said given identifier, the one or more descriptions comprising one or more words derived from a room in which said at least one of said one or more objects and/or features is located and one or more words describing said at least one of said one or more objects and/or features.

9. A system of claim 8, wherein said at least one processor is configured to use said at least one input interface to receive one or more given descriptions of objects within a certain distance of said given remote controllable device, select one or more object models based on said one or more given descriptions and associate said selected one or more object models with said given identifier of said given remote controllable device in said memory.

10. A system as claimed in claim 1, wherein said given remote controllable device comprises a controllable light source.

11. A lighting system comprising the system of claim 1 and said given remote controllable lighting device.

12. A method of identifying a given remote controllable device using a camera and remotely controlling said identified given remote controllable device, said method comprising:
obtaining an image captured with a camera, said image capturing at least a surrounding of said given remote controllable device and said given remote controllable device;
recognizing one or more objects and/or features in said surrounding of said given remote controllable device by analyzing said image,
wherein said one or more objects and/or features is distinct from said given remote controllable device and wherein said one or more objects and/or features is primarily configured for a function that is distinct from controlling said given remote controllable device;
identifying said given remote controllable device by selecting a given identifier associated with at least one of said one or more objects and/or features from a plurality of identifiers stored in a memory, said memory comprising associations between said plurality of identifiers and remote controllable devices and said selected given identifier being associated with said given remote controllable device;
determining a control mechanism for controlling said identified given remote controllable device; and
controlling said identified given remote controllable device using said determined control mechanism;
wherein said at least one processor is configured to recognize said given remote controllable device in said image and select said given identifier based on the recognizing in the image of both the given remote controllable device and the at least one of said one or more objects and/or features.

13. A non-transitory computer readable medium comprising a code of instructions, wherein the code of instructions is configured to cause at least one processor to perform the method of claim 12 when the at least one processor executes the code of instructions.

* * * * *